United States Patent [19]

Naka

[11] 4,093,499
[45] June 6, 1978

[54] APPARATUS FOR PRODUCING FLEXIBLE NON-SKID STRIP

[76] Inventor: Hiromitsu Naka, No. 39, Caza Shinmachi, Yashio-shi, Saitama-ken, Japan

[21] Appl. No.: 742,115

[22] Filed: Nov. 15, 1976

Related U.S. Application Data

[60] Continuation of Ser. No. 557,886, March 12, 1975, abandoned, which is a division of Ser. No. 483,005, Jun. 25, 1974, abandoned.

[30] Foreign Application Priority Data

Jul. 16, 1973  Japan .................. 48-79785

[51] Int. Cl.² .................. B29G 3/00; B29G 3/06; B29G 3/08
[52] U.S. Cl. .................. 156/498; 156/244.27; 156/499; 156/500; 156/513; 156/514; 425/113; 425/114

[58] Field of Search ................ 156/71, 231, 233, 241, 156/244, 247, 289, 322, 324, 498, 500, 499, 513, 514; 264/130, 148, 149, 171, 259, 271, 274, 279; 16/10; 425/113, 114, 97, 384, 404, 461, 465; 52/179, 181

[56] References Cited

U.S. PATENT DOCUMENTS

| 2,094,428 | 9/1937  | Fulton ............... 156/247 |
| 2,096,347 | 10/1937 | Short ................ 425/113 |
| 2,401,551 | 6/1946  | Cook ................. 425/113 |
| 2,688,581 | 9/1954  | Stubbs ............... 156/231 |
| 3,067,455 | 12/1962 | Reid ................. 425/113 |
| 3,150,217 | 9/1964  | Shanck et al. ....... 425/114 |
| 3,254,971 | 5/1966  | Garling .............. 156/247 |
| 3,780,152 | 12/1973 | Friesner ............. 425/244 |

Primary Examiner—Caleb Weston
Attorney, Agent, or Firm—Wenderoth, Lind & Ponack

[57] ABSTRACT

An apparatus for making a flexible non-skid strip of flattened semi-circular cross-section.

3 Claims, 66 Drawing Figures

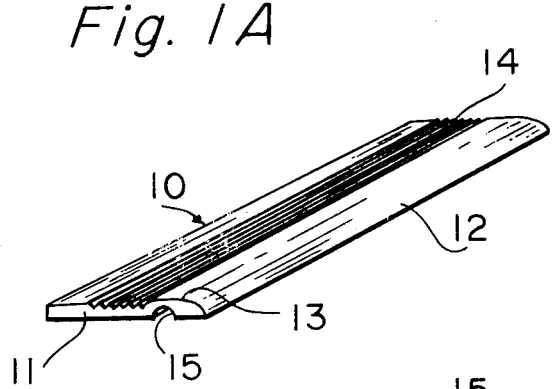
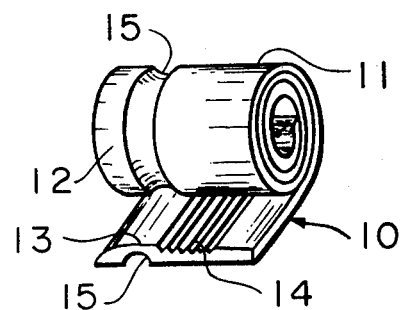
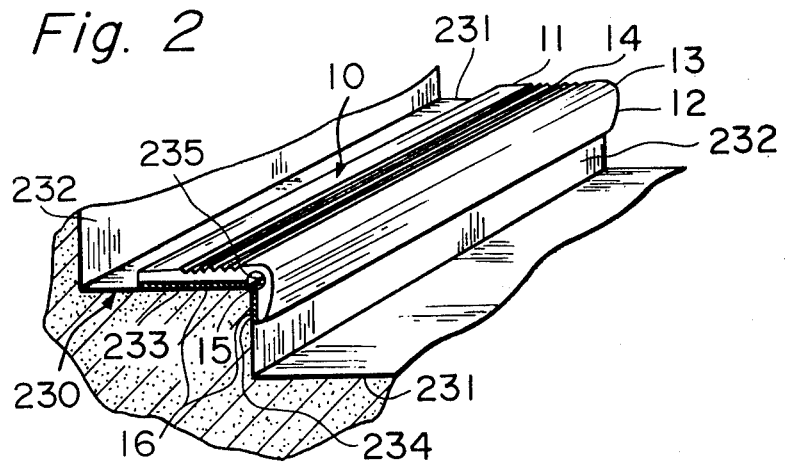

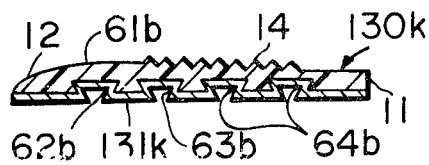
Fig. 13K
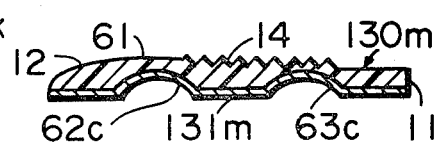
Fig. 13M
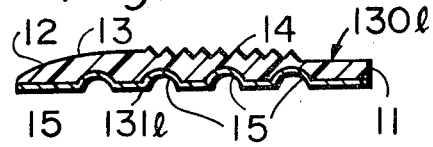
Fig. 13L
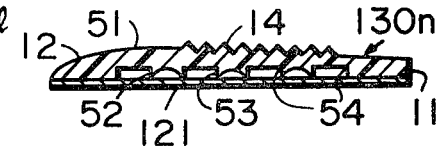
Fig. 13N
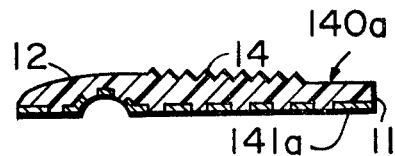
Fig. 14A
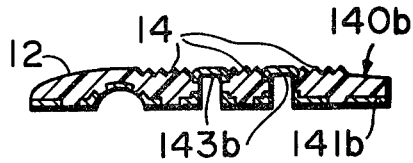
Fig. 14B
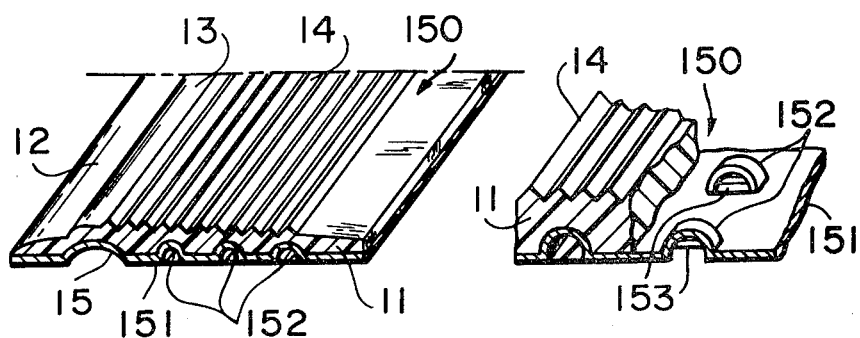
Fig. 15A
Fig. 15B

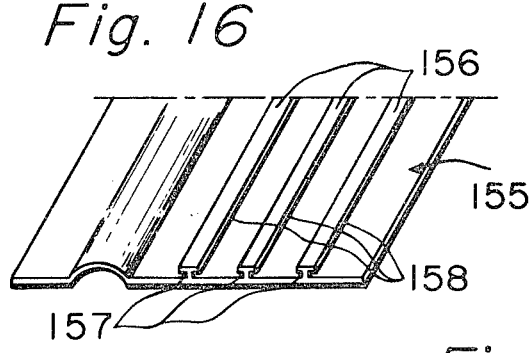
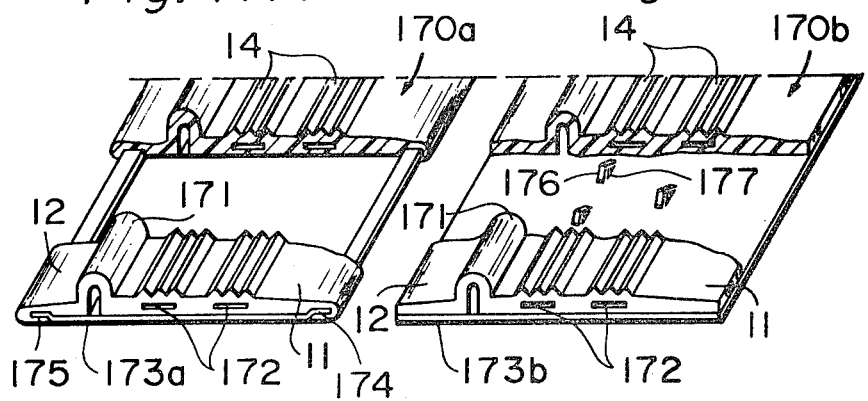
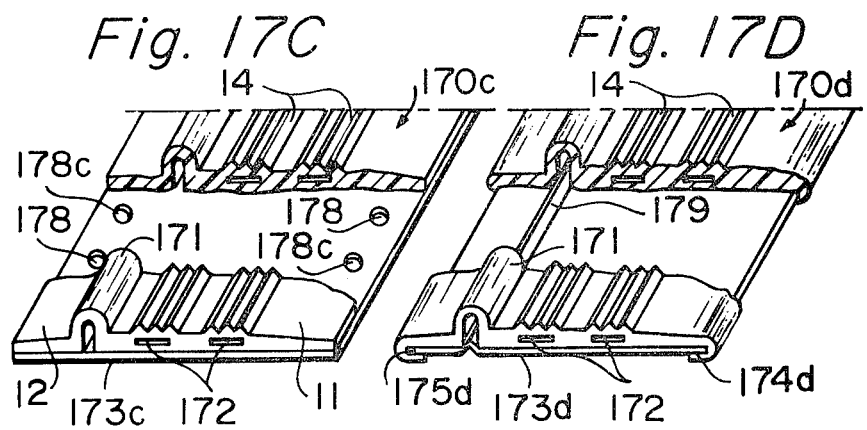

4,093,499

APPARATUS FOR PRODUCING FLEXIBLE NON-SKID STRIP

This is a continuation, of application Ser. No. 557,886, filed Mar. 12, 1975, which in turn is a division of application Ser. No. 483,005, filed June 25, 1974.

This invention relates to flexible non-skid strips to be installed on stairs, floors, sloped passages, station platforms and the like, process for continuously producing the strips and apparatus for carrying out the process.

DESCRIPTION OF THE PRIOR ART

There have been proposed and practically employed a variety of protective stair edgings for protecting the edges of stairs against potential damages and also for protecting persons who walk on the stairs against potential slippage on the stairs.

One of the most typical prior art protective stair edgings comprises an integral structure formed of rubber or synthetic resin which includes a main body provided with a non-skid top surface portion and a front anchoring flange extending downwardly from the forward edge of the main body and adapted to be fitted on a corner of a stair.

Another typical prior art protective stair edging comprises a metal body provided with one or more cavities defined by upstanding retention projections, and a replaceable insert member for each cavity held in position by mating engagement with the retention projections.

The above-mentioned two types of prior art protective stair edgings have usually been secured to the steps of stairs by means of suitable anchors.

However, these typical prior art protective stair edgings have various disadvantages.

These prior art protective stair edgings are usually produced having predetermined different cross-section configurations and lengths on mass production scale and stored in warehouses until they are actually employed. In use, one continuous length of protective stair edging having a cross-section configuration most close to that of a stair on which the edging is to be installed is selected from those in storage and a section is of a length substantially equal to the width of the stair cut off the remaining portion of the selected edging. Therefore, these prior art protective stair edgings have a relative limited range of application and there occurs a substantial amount of material loss in the cutting operation of these edgings.

As a result, these prior art protective stair edgings referred to above can be installed on only stairs, but not employed on floors, sloped passages and the like where flattened non-skid strips should be employed instead of the mono-purpose protective stair edgings. Furthermore, since these prior art protective stair edgings are usually available in a relatively limited length range, there occurs a substantial loss in the material when the edgings are cut to lengths equal to particular widths of stairs on which they are installed and the prior art protective stair edgings are not economical.

SUMMARY OF THE INVENTION

Therefore, one object of the present invention is to provide a flexible non-skid strip which can be easily installed on stairs, floors, sloped passages, station platforms and the like regardless whether the support structures are formed of wood, steel, concrete or stone.

Another object of the present invention is to provide a flexible non-skid strip a portion of which can be easily bent in the longitudinal direction of the strip in conformity with the configuration of the edge of a particular stair where the strip is installed and which, once bent, will not return to its original flat state.

Another object of the present invention is to provide a flexible non-skid strip which can be simply installed on a stair in a relatively short period of time without requiring any specific jig and which can be also easily replaced.

Another object of the present invention is to provide a flexible non-skid strip which can be easily cut to a desired size in its installation site without the generation of a substantial material loss.

Another object of the present invention is to provide a flexible non-skid strip for building which can be easily installed even by any layman.

Another object of the present invention is to provide a flexible non-skid strip which is adapted to be positioned over the edge of a stair where most severe impact is imposed due to treading pressure and which has a bent portion imparted with impact buffering property so as to reduce wear of the strip.

Another object of the present invention is to provide a flexible non-skid strip which is imparted with such a resilience so as to provide a comfortable treading feel.

Another object of the present invention is to provide a flexible non-skid strip which is less subject to elongation and contraction due to variation in ambient temperature, which can be positively prevented from being separated from a stair on which the strip is installed and which is so rigid that the strip may have a long service life.

Another object of the present invention is to provide a flexible non-skid strip which is less subject to wear and can retain its slippage prevention function for a long period of time.

Another object of the present invention is to provide a flexible non-skid strip in the form of a continuous length of narrow web which can be rolled for storage and transportation.

Another object of the present invention is to provide a flexible non-skid strip which enables persons walking on a staircase to discern the stairs and the width of the stairs under adverse conditions such as power stoppage and the like at night whereby they can walk on the stairs safely under such conditions.

A further object of the present invention is to provide a process for continuously producing such flexible non-skid strips.

A still further object of the present invention is to provide an apparatus for continuously producing such flexible non-skid strips.

The above and other objects and attendant advantages of the present invention wll be more readily apparent to those skilled in the art from the following description when read in connection with the accompanying drawings.

DESCRIPTION OF THE DRAWINGS

FIG. 1A is a perspective view of a preferred embodiment of flexible non-skid strip of the invention;

FIG. 1B is a perspective view of said strip of FIG. 1A in a rolled state;

FIG. 2 is a perspective view of said strip of FIG. 1 as being installed on a concrete stair;

FIGS. 3A and 3B are cross-sectional views of a modified embodiment of flexible non-skid strip of the present invention of which FIG. 3B shows the strip as being installed on a wooden stair;

FIGS. 5A and 5B are cross-sectional views of further modified embodiment of flexible non-skid strip of the invention of which FIG. 5B shows the strip as being installed on a concrete stair;

FIG. 12 is a perspective view of a further modified embodiment of flexible non-skid strip of the invention with a portion thereof cut away;

FIGS. 13A, 13B, 13C, 13D, 13E, 13F, 13G, 13H, 13I, 13J, 13K, 13L, 13M, 13N, 14A and 14B are cross-sectional views of further modified embodiments of flexible non-skid strip of the invention;

FIG. 15A is a perspective view of further modified embodiment of flexible non-skid strip of the invention with a portion thereof cut away;

FIG. 15B is a perspective view on an enlarged scale of said embodiment as shown in FIG. 15A with a portion thereof cut away and a portion thereof in section;

FIG. 16 is a perspective view of a modification of the web sheet member employed in said embodiment as shown in FIGS. 15A and 15B with a portion thereof cut away;

FIGS. 17A, 17B, 17C and 17D are perspective views of further embodiments of flexible non-skid strip of the invention with a portion thereof in section and a portion thereof cut away;

FIG. 26 is a top plan view of said apparatus of FIG. 26;

DESCRIPTION OF THE PREFERRED EMBODIMENTS

Figure 3A:
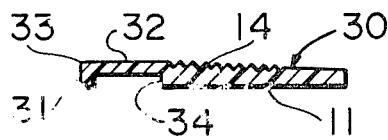

Referring to the accompanying drawings and more particularly, to FIGS. 1A, 1B and 2 thereof, a preferred embodiment of flexible non-skid strip produced by the present invention is generally shown by numeral 10 and has a flattened semi-circular cross-section in the transverse direction. The strip 10 includes an elongated main body or rear portion 11, a forward edge anchoring portion 12 extending parallel to and spaced from the main body and a connection portion 13 interposed between the main body 11 and edge portion 12 to integrally connect them together.

The main body 11 is formed on the upper surface with any suitable non-skid top surface portion such as serrations 14 extending along the entire length of the body and the connection portion 13 is designed to have a thickness smaller than the main body 11 and forward edge portion 12. For the purpose, the bottom of the connection portion 13 is formed with a semi-circular groove 15 opening downwardly and extending along the entire length of the portion 13. The forward edge portion 12 has the upper surface sloping downwardly and forwardly or smoothly decreases its thickness toward its extreme forward edge thereof. The strip 10 having the construction as mentioned above may be produced by integrally extruding any suitable one selected from thermoplastic synthetic resins such as vinyls, polyolefins, celluloses and synthetic rubber.

The flexible non-skid strip 10 is installed on a concrete stair 230 as shown in FIG. 2. In the installation of the strip, a suitable adhesive 16 is first applied on fixing areas 233 and 234 of the tread 231 and riser 232 of the stair which are connected together by the edge 235 at right angles to each other and the strip 10 is then applied on the stair 230 with the main body 11 positioned on the adhesive-applied area 233 and the groove 15 positioned over the edge 235.

Thereafter, the forward edge portion 12 is bent downwardly at the juncture between the forward edge portion 12 and the connection portion 13. The bending of the forward edge portion 12 is assisted by the presence of the groove 15. Finally, a suitable pressure is applied on the main body 11 and forward edge portion 12 so as to cause the parts of the strip to adhere to the tread 231 and riser 232 of the stair 230, respectively, whereby the strip 10 is held in position on the stair 230. A pressure sensitive adhesive tape having a release paper may be applied to the bottom of the strip 10 covering the main body 11, connection portion 13 and edge portion 12 to provide a pressure sensitive adhesive layer and in such a case, the application of the adhesive 16 to the stair 230 can be eliminated.

As mentioned hereinabove, since the strip 10 has the flattened semi-circular cross-section as seen in the transverse direction and includes the thinned connection portion 13, prior to the use of the strip 10, the strip can be rolled for easy storage and transportation as shown in FIG. 1B. In use, when it is assumed that the forward edge portion 12 is bent downwardly and the adhesive 16 is applied to the stair, the strip neither requires any specific curing jig, nor a long curing time. Thus, the installation operation of the strip 10 can be carried out in a brief period of time. Especially, when the strip 10 itself includes the pressure sensitive adhesive tape, the steps of application of the adhesive 16 to the stair 10 and of curing the adhesive 16 after the installation of the strip so as to cause the strip to adhere firmly to the stair can be eliminated. Furthermore, the possibility of application of the adhesive 16 at areas other than the portions 233 and 234 of the stair tread and riser 231 and 232 which may occur during the application of the adhesive to the portions 233 and 234 can be prevented.

Furthermore, since the connection portion 13 includes the groove 15 which is positioned over the edge 235 of the stair 230 when the strip 10 is held in position, the connection portion 13 which is adapted to subjected to higher treading impact than the other parts of the strip is imparted thereto an impact absorption capability whereby wear on the strip itself can be reduced and the strip can enjoy a prolonged service life and has a comfortable treading feel.

Furthermore, since the strip 10 is adapted to be directly adhered to the stair 230, the installation of the strip can be quite easily effected and the strip can be installed on a wide variety of structures such as stairs in ships, floors, sloped passages, station platforms and general houses' wooden stairs as well as concrete, stone and steel stairs where the strips are generally installed. And the installation of the strip 10 can be easily affected by any unskilled person.

Furthermore, when the strip 10 is produced in an indefinite length and rolled, the rolled strip is conveniently stored and transported. Then, a desired section can be cut off the rolled strip in conformity with the width of a stair on which the strip is installed.

Figure 3B:
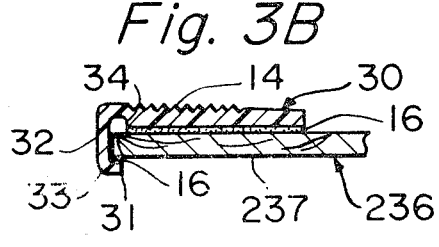

FIGS. 3A and 3B show a modified embodiment of strip 30 which is substantially similar to the strip 10 in FIGS. 1A, 1B and 2 except for the forward edge portion 31 and connection portion 32. Therefore, the parts corresponding to those of the first embodiment are shown by the same numerals and description thereof are omitted.

In the modified strip 30, the connection portion 32 has a relatively wide groove 34 of rectangular cross-section in the bottom thereof and the forward edge portion 31 extends along the free edge 33 of the connection portion 32 at right angles with respect to the connection portion to the bottom surface of the main body 11 having serrations 14 on the upper surface.

As shown in FIG. 3B, the strip 30 is conveniently installed on a step 236 comprising a tread plate 237 thereon. In the installation of the strip 30, first of all, a suitable adhesive 16 is applied on the entire bottom surface of the strip including the main body 11, forward edge portion 31 and connection portion 32 and then the strip is positioned on the tread plate 237 with the inner face of the forward edge portion 31 engaging the underside of the forward end of the tread plate followed by the pressing of portions of the forward edge and connection portions against the forward end of the tread plate through the adhesive 16. Finally, the remaining portion of the connection portion 32 is bent so as to embrace the forward end and the main body 11 is pressed against the treading surface of the tread plate through the adhesive 16.

Figure 4A:
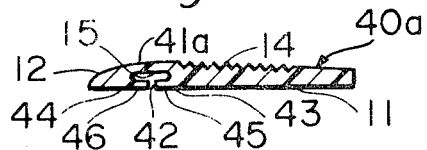
FIGS. 4A, 4B and 4C are cross-sectional views of further modified embodiments of flexible non-skid strip of the invention.
Figure 4B:
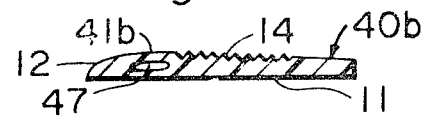
Figure 4C:
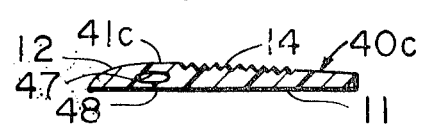

FIGS. 4A, 4B and 4C show further modified embodiments of the invention. In the strips 40a, 40b and 40c shown in these Figures, the connection portions have cross-sections different from that of the corresponding part of the strip 10 and the remaining parts of these modified embodiments are substantially similar to the corresponding parts of the first embodiment. Therefore, the corresponding parts are shown by the same numerals and description of these parts are omitted.

First, referring to FIG. 4A, the connection portion 41a is provided with a groove 15 extending in the length of the connection portion and a slit 42 is defined in the bottom of the connection portion by a pair of flanges 45 and 46 extending from the opposite edges 43 and 44 of the main body and forward edge portion toward each other and lying on the same plane as the bottom of the strip 40a.

In the strip 40b of FIG. 4B, the connection portion 41b which connects between the main body 11 and the forward edge portion 12 has an opening 47 of oval cross-section therein extending along the length of the connection portion.

In the strip 41c of FIG. 4C, the connection portion 41c has a cut 48 in the bottom extending upwardly to an opening 47 of oval cross-section. Alternatively, the cut 48 may be eliminated if the flanges 45 and 46 are extended until the free ends of the flanges contact each other.

Figure 5A:
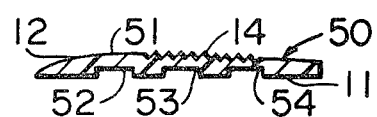
Figure 5B:
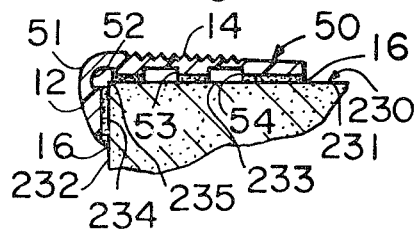

FIGS. 5A and 5B show a further modified embodiment of the invention and the strip of these Figures is generally shown by numeral 50. In the strip 50, the connection portion 51 which connects between the main body 11 and forward edge portion 12 has a groove 52 of rectangular cross-section in the bottom extending in the length of the connection portion. Furthermore, the main body 11 also has a pair of spaced and parallel grooves 53 and 54 similar to the groove 52 in the connection portion extending in the length of the main body so that the main body will have an improved shock absorption ability. In FIG. 5B, the strip 50 of FIG. 5A is shown as being installed on a concrete stair. In the installation of the strip 50, first, a suitable adhesive 16 is applied on the bottom surface of the strip 50 and the strip is then applied on the fixing portion 233 of the tread 231 of the stair 230 with the groove 52 in the connection portion 51 positioned over the edge 235 of the stair 230. Thereafter, the connection portion 51 is bent downwardly until the groove 52 will embrace the stair edge 235 and the forward edge portion 12 will contact the fixing portion 234 of the riser 232. Finally, the strip 50 is adhered to the stair by pressing the strip against the stair 230 through the adhesive 16.

Figure 6A:
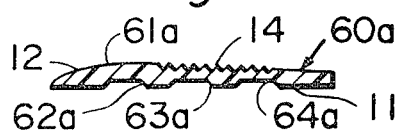
FIGS. 6A, 6B and 6C are cross-sectional views of further modified embodiments of flexible non-skid strip of the invention.
Figure 6B:
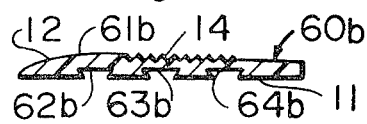
Figure 6C:
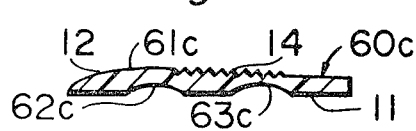

FIGS. 6A, 6B and 6C show further modified embodiments of the invention which are substantially similar to the strip 50 as shown in FIGS. 5A and 5B except for that the cross-section configuration and number of the grooves in the strip 50 of FIGS. 5A and 5B are different. The remaining parts of the embodiment of FIGS. 6A, 6B and 6C are substantially similar to the corresponding parts of the embodiment of FIGS. 5A and 5B and are shown by the same numerals. Thus, description of the similar parts of the embodiment of FIGS. 6A, 6B and 6C are omitted. And since the manner in which the embodiment of FIGS. 6A, 6B and 6C is installed on a stair is the same as that of the embodiment of FIGS. 5A and 5B, description of the installation manner of the embodiment of FIGS. 6A, 6B and 6C is also omitted.

In the strip 60a of FIG. 6A, the connection grooves 62a and shock absorbing grooves 63a and 64a provided in the bottoms of the connection portion 61a and main body 11 are of a trapezoid cross-section. In the strip 60b of FIG. 6B, the connection groove 62b and shock absorbing grooves 63b and 64b provided in the connection portion 61b and main body 11, respectively, are of a dovetail cross-section. In the strip 60c of FIG. 6C, the connection groove 62c and shock absorbing groove 63c provided in the connection portion 61c and main body 11, respectively, are of a relatively large radius semi-circular cross-section.

Figure 7:
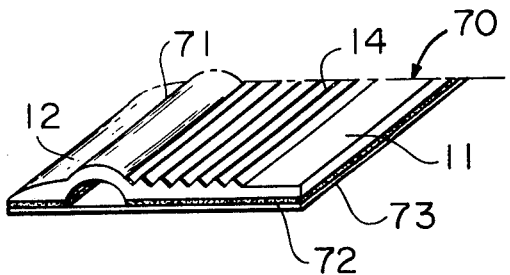
FIG. 7 is a perspective view of a further modified embodiment of flexible non-skid strip of the invention with a portion thereof cut away.

The strip 70 of FIG. 7 has a modified connection portion 71 of an arcuate cross-section which is different from the corresponding parts of the preceding embodiments and an adhesive layer comprising a pressure sensitive tape 72 having a release paper 73 is applied on the entire bottom surface of the strip 70.

The strip 70 also includes the main body 11 having the non-skid top surface portion or serrations 14 and forward edge portion 12 connected to the main body by the connection portion 71 having the arcuate cross-section. Furthermore, the strip 70 includes the pressure sensitive adhesive layer having the release paper 72 applied on the bottom surface thereof. The center area of the connection portion 71 project above the upper surfaces of the main body 11 and forward edge portion 12 and the thickness of the connection portion 71 is smaller than that the main body and forward edge portion 12.

In the installation of the strip 70, first, the release paper 73 is removed from the strip 70 and then, the main body 11 is placed onto a portion of the tread of a stair with the concaved side of the arcuate cross-section connection portion 71 positioned over the edge of the stair. Since the succeeding steps in the installation of the strip 70 are substantially similar to that described in connection with the strip 10, description of such similar steps are omitted. As mentioned hereinabove, since the connection portion 71 projects above the main body 11 and forward edge portion 11, the arcuate connection portion 71 can be employed as the reference against the stair edge when the strip 70 is positioned on the stair.

Figure 8A:
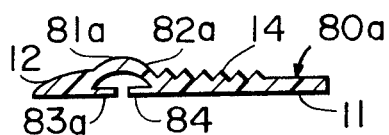
FIGS. 8A, 8B, 9A and 9B are cross-sectional views of further modified embodiments of flexible non-skid strip of the invention.
Figure 8B:
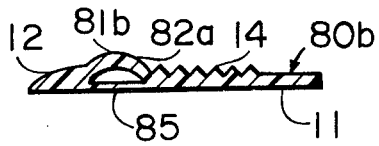

The strips 80a and 80b of FIGS. 8A and 8B have connection portions modified from the corresponding part of the strip 70 of FIG. 7 and the remaining parts of this embodiment are substantially similar to the corresponding parts of the embodiment of FIG. 7. Therefore, the similar parts of the embodiment of FIGS. 8A and 8B are shown by the same numerals and description of them are omitted.

The connection portions of the strips 80a and 80b of FIGS. 8A and 8B have different cross-section configurations from that of the corresponding part of the embodiment of FIG. 7 and in these Figures, the pressure-sensitive adhesive layer is not shown.

In the strip 80a of FIG. 8A, the connection portion 81a which has a arcuate upper portion 82a is of an arcuate cross-section having a thin thickness and the bottom of the arcuate connection portion 81a is defined by a pair of thin flanges 83a and 84 extending from the opposite lower edges of the main body 11 and forward edge portion 12 into the semi-circular cross-section cavity defined by the arcuate configuration of the connection portion 81a.

In the strip 80b of FIG. 8B, the connection portion 81b which has an arcuate upper portion 82a defines an arcuate cross-section cavity therein and the bottom of the cavity is closed by a thin sheet-like cross piece 85.

With the provision of the thin flanges 83a, 84a and sheet-like cross piece 85 in the strips 80a and 80b, respectively, after the installation of the strip on a stair, the strip is prevented from being displaced at the connection portion with respect to the stair when the strip is subjected to treading pressure.

Figure 9A:
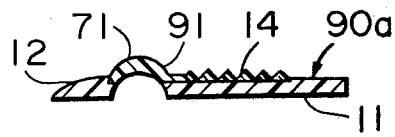
Figure 9B:
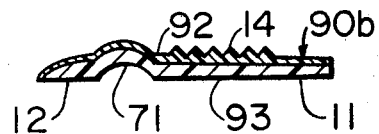

The strips 90a and 90b of FIGS. 9A and 9B are modifications of the strip 70 of FIG. 7. The strips 90a and 90b are shown with the pressure sensitive adhesive layer removed therefrom. The installation manner of the strips 90a and 90b is similar to that for the embodiment of FIG. 7 and description of the installation manner of these modified strips are omitted.

The strip 90a of FIG. 9A further includes the main body 11 having the non-skid top surface portion or serrations 14 and the forward edge portion 12 connected to the main body by the connection portion 71 of arcuate cross-section similar to the corresponding part of the strip in FIG. 7. The top surface portion 14 and arcuate cross-section connection portion 71 are formed of a high wear-resistance synthetic resin such as urethane or polyamid, for example, to provide an upper layer 91 and the remaining portion of the main body 11 and the forward edge portion 12 are formed of a flexible synthetic resin such as non-rigid vinyl chloride. The upper layer 91, the main body 11 and forward edge portion 12 are secured together into a unitary structure.

If the surface layer 91 has a different color from the color of the remaining portion of the main body 11 and forward edge portion 12, wear on the surface layer is visible if any and accordingly, the time when the strip 90a should be replaced can be determined. The multi-colored strip has aesthetical appearance.

The strip 90b of FIG. 9B includes the main body 11 having the non-skid top surface portion or serrations 14 and forward edge portion 12 connected to the main body by the connection portion 71 of arcuate cross-section as in the embodiment of FIG. 9A, but has an integrally formed laminated construction, that is, the strip of FIG. 9B including the serrations 14 and the upper layer 92 formed of a high wear-resistance synthetic resin such as urethane or polyamid and the lower layer 93 constituting the remaining lower portions of the main body, forward edge portion and connection portion 11, 12 and 71 and formed of a flexible synthetic resin such as non-rigid vinyl chloride. The upper and lower layers may different colors so that the strip 90b provides the same effects as the strip 9a does.

Figure 10:
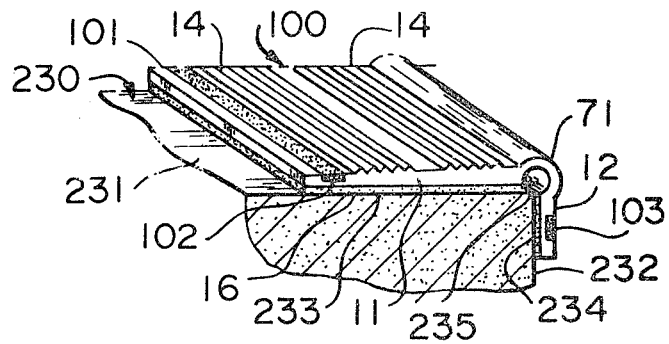
FIG. 10 is a perspective view of a further modified embodiment of flexible non-skid strip of the invention with a portion thereof cut away showing the strip as being installed on a wooden stair.

FIG. 10 shows a further modification of the strip 70 of FIG. 7. The strip 100 includes the main body 11, forward edge portion 12 and connection portion 71 of arcuate cross-section connecting between the main body and forward edge portion. The main body 11 has two sets of longitudinally extending serrations 14 thereon in a spaced relationship to each other and a plurality of longitudinally extending fluorescent layers 102 and 103 in the form of a strip are embedded in the upper surface of the main body and forward edge portion, respectively with the upper surface exposed.

In the installation of the strip 100, first a suitable adhesive 16 is applied on the underside of the strip 100 and then, the strip is placed on the tread 231 of a stair 230 with the connection portion 71 positioned over the edge 235 of the stair 230. The succeeding steps of the installation are the same as described in connection with the installation of the strip 10 of FIG. 1 and description of such steps is omitted.

Since the strip 100 includes the fluorescent layers 102 and 103 embedded in the upper surface, when the strip 100 is held in position on the stair 230, even if power supply is stopped in case of emergency such as fire occurrence and power stoppage at night, the width of the stairs and/or the distance between adjacent stairs can be descerned and therefore, the strip 100 provides safety characteristics. Although the fluorescent layers are shown as being positioned at the rear edge of the main body 11 and at the forward edge portion 12, it may be sufficient to provide the fluorescent layer 102 or 103 either at the main body or forward edge portion as desired.

FIGS. 11A, 11B, 11C, 11D and 11E show modifications of the strip 100 of FIG. 10 and in the embodiments of these Figures, the position and construction of the fluorescent layers are modified. The remaining parts of the strips 110a, 110b, 110e are shown by the same numerals as those used for corresponding parts of the embodiment of FIG. 10, and the manner in which the strips 110a, 110b and 110e are installed is similar to that for the strip 100 of FIG. 10. Therefore, description of the corresponding parts and the installation manner of these strips are omitted.

Figure 11A:
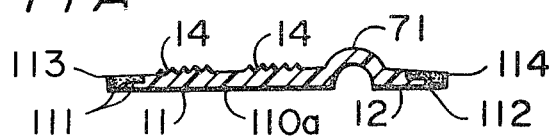
FIGS. 11A, 11B and 11E are cross-sectional views of further modified embodiments of flexible non-skid strip of the invention.

The strip 110a of FIG. 11A has fluorescent layers 113 and 114 embedded in the rear edge 111 of the main body 11 and in the extreme forward edge 112 of the forward edge portion 11, respectively.

Figure 11B:
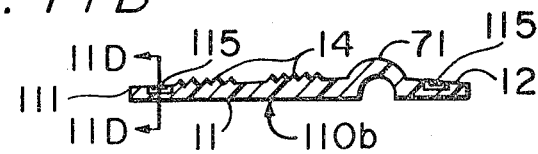
Figure 11C:
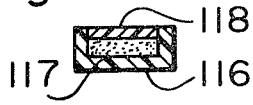
FIG. 11C is a cross-sectional view on an enlarged scale of the fluorescent layer as shown in FIG. 11B.
Figure 11D:
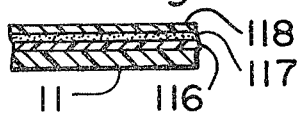
FIG. 11D is a sectional view taken substantially along the line 11D — 11D of FIG. 11B.

The strip 110b of FIGS. 11B, 11C and 11D has fluorescent layers 115, 115 integrally formed in the main body 11 at the rear edge 111 thereof and forward edge portion 12, respectively and the upper surface of the layers 115 is exposed to the upper surface of the main body 11 and forward edge portion 12.

Each of the fluorescent layers 115 comprises an elongated channel 116 of U-shaped cross-section, a fluorescent material strip 117 received in the channel and a transparent covering strip positioned over and secured to the fluorescent material strip.

The elongated channel 116 is formed of a flexible synthetic resin having titanium dioxide and a pigment such as white lead blended therewith, the fluorescent material strip 117 is formed of a transparent synthetic resin sheet having a fluorescent pigment blended therewith and the transparent covering strip 118 is formed of a transparent synthetic resin having a ultraviolet ray absorption agent blended therewith.

Therefore, the fluorescent material strips 117 of the fluorescent layers 115, 115 are protected against the staining by mud and dirt from the footwears of persons who walk on stairs where the strips are installed and also prevented from being removed from the main body 11. Furthermore, since the fluorescent material strips 117 are received in the channels 116, ultraviolet rays are prevented from passing through the fluorescent material strips 117.

Figure 11E:
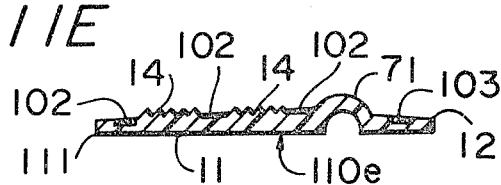

The strip 110e of FIG. 11E is substantially similar to the strip 100 of FIG. 10 except for that the main body has three longitudinally extending fluorescent layers 102, that is, the main body further has one fluorescent layer 102 between the arcuate connection portion 71 and the adjacent non-skid top surface portion or serrations 14 and another fluorescent layer 102 between the two non-skid top surface portions or serrations 14. The two additional fluorescent layers 102 are adhered to the upper surface of the main body 11. Therefore, the fluorescent layers 102 are prevented from being directly contacted by the footwears of persons who walk on stairs where the strips are installed, are subject to less wear due to treading pressure and can enjoy a longer service life.

Figures 12, 13A, 13B, 13C, 13D, 13E, 13F, 13G, 13H, 13I, 13J:
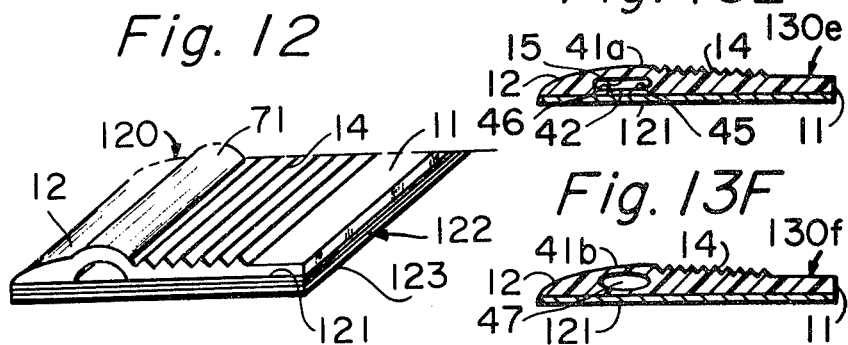
Figure 18A:
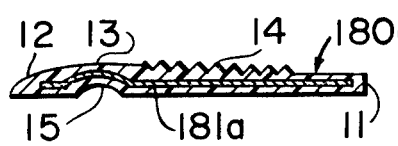
FIGS. 18A, 18B, 18C, 19A, 19B and 20 are cross-sectional views of further modified embodiments of flexible non-skid strip of the invention.
Figure 19A:
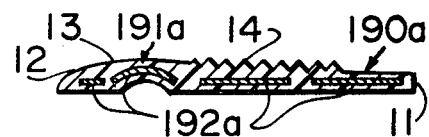
Figure 18B:
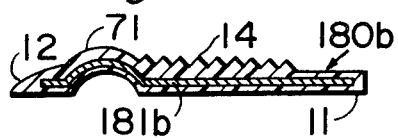
Figure 19B:
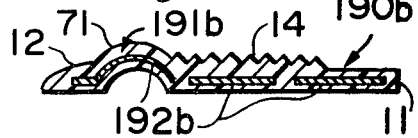
Figure 18C:
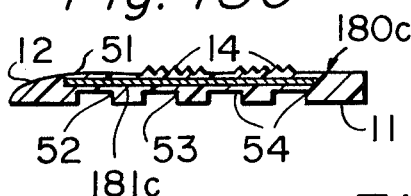

FIG. 12 shows a further modification of the strip 70 of FIG. 7 and is shown by numeral 120. The strip 120 includes the main body 11 formed of a flexible synthetic resin, forward edge portion 12 and connection portion 71 of arcuate cross-section connecting between the main body 11 and forward edge portion 12.

The main body 11 has the non-skid top surface portion or serrations 14 on the upper surface thereof and a web sheet 121 which may be formed of rigid synthetic resin, cloth or metal and has an area containing the main body 11, forward edge portion 12 and connection portion 71 is integrally formed with the under surface of the strip 120.

The web sheet 121 serves to impart rigidity to the strip against the elongation and contration of the strip whereby the retention of the strip on a stair is improved. Metals of which the web sheet may be formed include aluminum, copper, steel and stainless steel. Furthermore, a pressure sensitive tape 122 including a release paper 123 is applied on the underside of the web sheet 122.

The strip 120 can be also rolled as in the case of a hoop and the installation of the strip 120 is the same as that described in connection with the strips 10 and 70 of FIGS. 1 and 7 and description of the installation manner of the strip 120 is omitted.

FIGS. 13A through 14B inclusive show various modifications of the strip 120 of FIG. 12 and these modified strips are shown by numerals 130a, 130b, 130c, 130d, 130e, 130f, 130g, 130h, 130i, 130j, 130k, 130l, 130m, 130n, 140a and 140b, respectively. The strips have web sheets 121 integrally secured to the undersides of these strips or the grooved undersides with web sheets 131d, 131g, 131i, 131j, 131k, 131l and 131m integrally secured thereto. These web sheets have configurations in conformity with particular configurations of the undersides of the strips to which the sheets are secured. In each of the strips shown in these Figures, the pressure sensitive adhesive tape 122 including the release paper 123 is eliminated. The remaining parts of these modified strips are shown by the same numerals as those used for the corresponding parts of the strip 120 and description of the corresponding parts is omitted. The manner in which these strips are installed on stairs is the same as that for the strip 120 and description of the same is omitted.

The strip 130n of FIG. 13N has the under surface which is a modification of that of the strip 50 of FIG. 5A and has a web sheet 121 is integrally secured thereto.

The strip 140a of FIG. 14A has a web sheet 141a integrally secured to the underside and the web sheet is similar to the web sheet 131c on the strip 130c of FIG. 13C, but has a plurality of holes 141a. The strip 140b of FIG. 14B includes a modification of the holed web sheet 141a of the strip 140a shown in FIG. 14A and the modified web sheet 141b on the strip 140b of FIG. 14B has plurality of spaced reversed U-shaped projections 143b received in the mating recesses in the main body and extending in the length of the strip.

Similarly, the web sheets employed in the strips of FIGS. 13A, 13B, 13D, — 13N can be replaced by the holed web sheets 141a and 141b employed in the strips of FIGS. 14A and 14B.

The strip 150 of FIGS. 15A and 15B includes a modification of the web sheet 131c employed in the strip 130c of FIG. 13C. The remaining parts of the strip 150 are shown by the same numerals as those used for the corresponding parts of the strip 130c and description of these corresponding parts is omitted. Similarly, since the manner in which the strip 150 is installed on a stair is the same as that for the strip 130c, description of the installation manner of the strip 150 is omitted.

The web sheet 151 of the strip 150 has a plurality of spaced arcuate engaging projections 152 formed by a press for engaging in the corresponding recesses in the underside of the strip 150. The engaging projections 152 define open cavities therein into which the material of the main body 11 of the strip 150 flows when the web sheet 151 is integrally formed together with the main body so that the main body and web sheet can be firmly held together against separation from each other.

The web sheet 155 shown in FIG. 16 includes a modification of the web sheet 151 employed in the strip 150 of FIGS. 15A and 15B. The configuration of the modified web sheet 155 is suitable when the web sheet is formed of a synthetic resin having a low adhesion ability to the flexible synthetic resin of which the main body, forward edge portion and connection portion are formed.

The web sheet 155 has three suitably spaced engaging means 156 on the upper surface thereof extending in the longitudinal direction. The engaging means comprise webs 157 and narrow flanges 158 integrally formed with the tip ends of the webs. The provision of the engaging means 156 on the web sheet 155 effectively prevents the strip and web sheet from separating from each other.

The strips 170a, 170b, 170c and 170d of FIGS. 17A through 17D are modifications of the strip 120 of FIG. 12 and the pressure-sensitive adhesive layer of these strips is not shown in these Figures. Since the strips 170a, 170b, 170c and 170d are installed in the same manner as that for the strip 120 of FIG. 12, the installation manner for these modified strips is omitted.

Each of the strips 170a, 170b, 170c and 170d includes the main body 11, forward edge anchoring portion 12 and arcuate connection portion 171 connecting between the main body and forward edge portion together. The main body 11 has two spaced sets of non-skid top surface portions or serrations 14 formed on the upper surface and extending in the length of the strip and two holes 172 of rectangular cross-section positioned below the serrations 14 extending in the length of the strip.

Furthermore, in order to prevent the strip and web sheet from separating from each other, in the strip 170a of FIG. 17A, the opposite longitudinal edges 174 and 175 of the web sheet 173 are bent upwardly above the plane of the rest of the sheet and embedded in the main body and forward edge portion, respectively. In the strip 170b of FIG. 17B, the web sheet 173b has a plurality of spaced engaging projections 172 of angular shape which serve in the same manner as the engaging projection 152 of the web sheet 151 in the strip 150 shown in FIGS. 15A and 15B. The projections 176 are formed by a press. The projections 176 have through holes 177 which serve in the same manner as the holes 153 in the engaging projections 152. In the strip 170c of FIG. 17C, the web sheet 173c has a plurality of spaced rows of holes 178 adjacent to the opposite edges each comprising a plurality of holes 178a. In the strip 170d of FIG. 17D, the web sheet 173d has the opposite edges 174d embedded in the main body 11 and forward edge portion 12, respectively. The web sheet 173d for the strip 170d of FIG. 17D has on the upper surface a upward projection 179 extending in the longitudinal direction of the strip so as to engage in the cavity defined by the connection portion 171 whereby in the installation of the strip, the positioning of the strip with respect to the tread of a stair and the bending of the forward edge portion are assisted.

Furthermore, the shape, arrangement and number of the above-mentioned engaging projections and engaging holes can be varied in various ways and the combination of the projections and holes can be also varied in various ways within the scope of the invention.

In each of the strips 180a, 180b, 180c, 190a and 190b shown in FIGS. 18A through 19B, in order to impart rigidity to the strip, each of the web sheets 181a, 181b, 181c, 191a and 191b is entirely embedded in the associated strip. The web sheets 191a and 191b for the strips 190a and 190b shown in FIGS. 19A and 19B each comprises a plurality of web sheet elements 192a and 192b, respectively.

Figure 20:
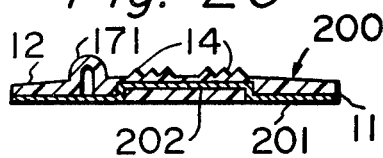

The strip 200 shown in FIG. 20 employs a web sheet 201 having a center upwardly bent and horizontally extending portion 202 embedded in the strip and extending in the longitudinal direction of the strip.

The remaining parts of the strips 180a, 180b, 180c, 190a, 190b and 200 are shown by the same numerals as those used for the corresponding parts of the strips of FIGS. 1, 5A, 7 and 17B. The manner in which the strip 200 is installed is the same as that for the strips shown in FIGS. 1, 5A, 7 and 17B and description of the installation manner is omitted.

As to the materials of which the above-mentioned strips are formed, the main body, forward edge portion and connection portion are preferably formed of flexible thermoplastic synthetic resins such as non-rigid vinyls, polyolefines or celluloses. The non-skid top surface portion and web sheet are preferably formed of any one selected from high wear-resistance synthetic resins such as urethane and polyamid if the parts are desired to have a high wear-resistance property. The web sheet is preferably formed of hard synthetic resin, cloth, aluminum, copper, steel or stainless steel, but may be formed of a porous sheet metal, porous steel sheet or expand metal.

Figure 21:
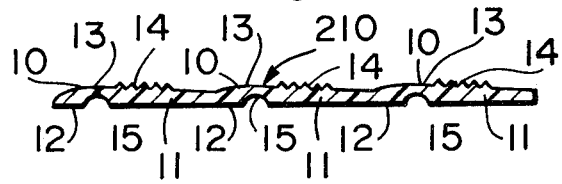
FIG. 21 is a cross-sectional view of a further modified embodiment of flexible non-skid strip of the invention comprising three strips of FIG. 1 formed in side-by-side arrangement.

FIG. 21 shows a strip assembly 210 comprising three strips 10 similar to that shown in FIG. 1 arranged in juxtaposed relationship. The parts corresponding to the parts of the strip 10 are shown by the same numerals and description of the same is omitted. When the strip assembly 210 is employed for covering the whole area of the tread of a stair, a floor or a sloped passage, the installation operation of the strip assembly can be effected promptly and easily. In such a case, a finish operation for the stair tread, floor or sloped passage can be eliminated.

Figure 22:
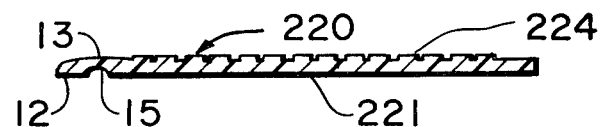
FIG. 22 is a cross-sectional view of a further modified embodiment of flexible non-skid strip having the width corresponding to the width of the tread of a stair.

The strip 220 of FIG. 22 has the main body 221 the width of which is designed to be equal to the width of the tread of a stair and the upper surface of the main body is formed with alternate concaves and convexes 224. The remaining parts of the strip 220 are similar to the corresponding parts of the strip 10 of FIG. 1 and shown by the same numerals as those used for the corresponding parts of the strip 220. Since the main body 221 has the width substantially corresponding to that of the stair tread where the strip is installed, when held in position, the whole area of the stair tread is imparted non-skid porperty. When the upper surface of the main body 221 is patterned with a particular design, the strip not only produces an aesthetical effect, but can eliminate the use of a carpet as well as a finish on the stair tread. Since the installation of the strip 210 on a stair is the same as that for the strip 10, description of the installation manner is omitted.

Figure 23:
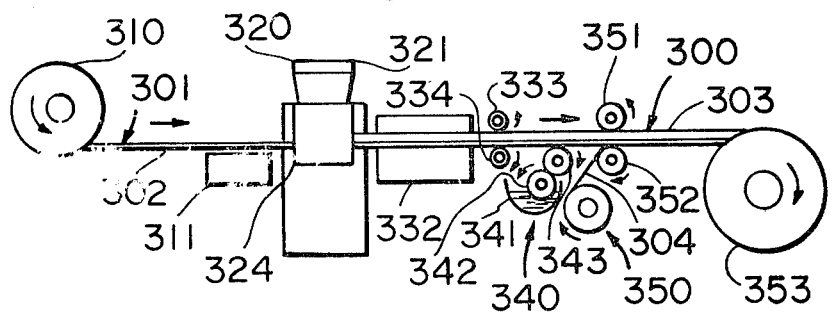
FIG. 23 is a schematic view of one embodiment of apparatus for continuously producing a flexible non-skid strip according to the present invention.
Figure 24:
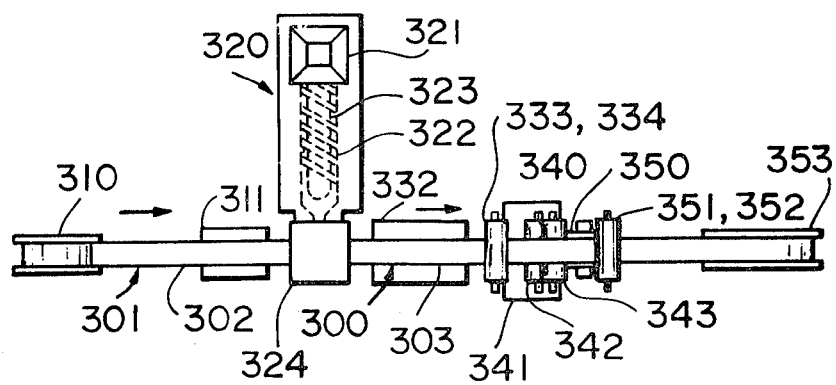
FIG. 24 is a top plan view of said apparatus as shown in FIG. 23.
Figure 25:
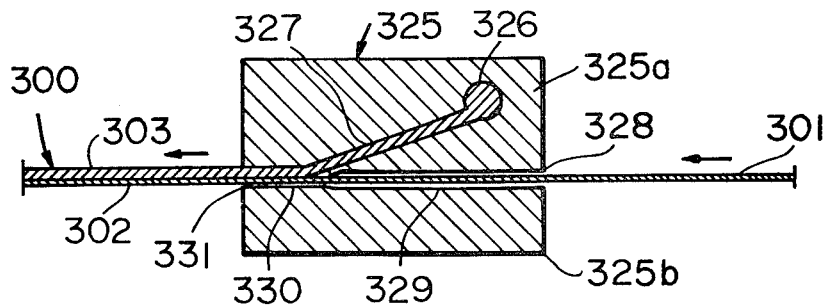
FIG. 25 is a longitudinally sectional view on an enlarged scale of the metal mold of the apparatus as shown in FIGS. 23 and 24.
Figure 26:
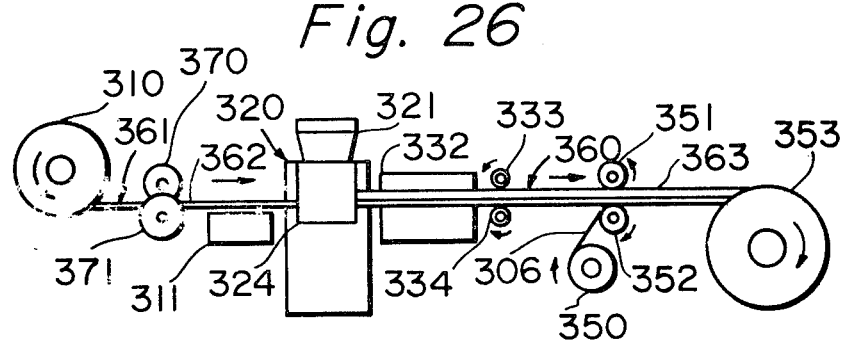
FIG. 26 is a schematic view in side elevation of a modified embodiment of apparatus for continuously producing flexible non-skid strips according to the present invention.
Figure 27:
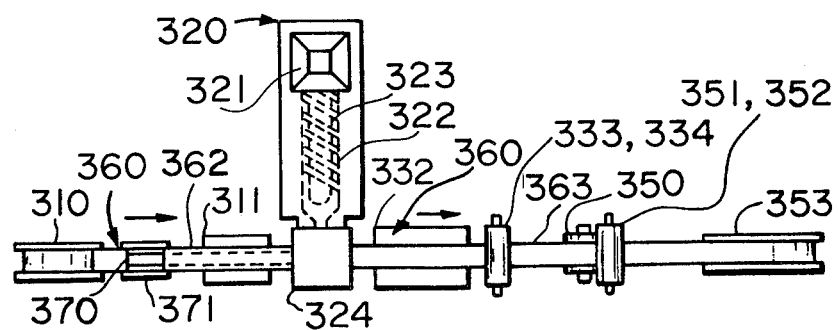

FIGS. 23 through 25 illustrates a process and apparatus for continuously extruding an indefinite length of flexible non-skid strip 300 from which discrete strips are sheared. The flexible non-skid strip 300 comprises a continuous length of flexible lower layer 301 formed of a continuous length of web sheet material 303 which can be rolled into a hoop and a synthetic resin flexible non-skid upper layer 303 including the main body, forward edge portion and connection portion of each strip. The upper layer is formed by continuously and integrally extruding a synthetic resin onto the moving lower layer.

In carrying out the process of the invention on the illustrated apparatus of the invention, first of all, a rolled web sheet 302 formed of rigid synthetic resin or cloth is continuously payed out from a supply roll 310 of feed means in increment and passed over heating means 331 positioned below the path of the sheet. After having passed over the heating means 311, the sheet 302 advances to and through the inlet 328 of a split die 325 mounted on a cross-head 324 in an extruder 320.

The heating means 311 is adapted to pre-heat the flexible lower layer 301 so that the upper layer 303 which is adapted to be integrally secured to the upper layer can be prevented from displacing relative to the lower layer. The split die 325 comprises an upper mould 325a and a lower mould 325b defining a sheet passage 329 therein and having the inlet 328. An upper layer application passage 330 is in communication with the inner end of the passage 329 and has the outlet 331.

A granular non-rigid vinyl chloride having plasticizer, stabilizer, lubricant and filler blended therewith is supplied at a hopper 321 into a heating cylinder 322 of the extruder 320. The non-rigid vinyl chloride is advanced through the cylinder 322 by a rotating screw 323 within the cylinder 322. As the vinyl chloride is advanced through the cylinder, the material is fused and the ingredients of the material are kneaded together. The fused and kneaded material is passed to and through a manifold 326 formed in the upper mould 325a of the die 325. The fused material then passes to and through a downwardly inclined passage 327 extending from the manifold 326 and terminating at the upper layer application passage 330 and enters the passage where the fused material is applied on the moving sheet 302 under pressure.

The cross-sectional configuration of the application passage 330 and outlet 331 is determined depending upon the cross-sectional configuration of the flexible non-skid strip 300 to be produced. After having issued through the outlet 331, the hot laminated strip 300 passes to and through a cooling tank 332 containing water where the strip is cooled. After having passed through the cooling tank 332, the laminated strip 300 passes between haul-off rolls 333 and 334 of a haul-off gear to be guided thereby to coating means 340 where the underside of the strip 100 is continuously coated with a pressure sensitive adhesive agent. After having been coated with the adhesive agent, the strip is advanced to release paper application means where the underside of the coating adhesive agent is continuously applied thereon a release paper 304 supplied from release paper supply means 350 by means of press rollers 351 and 352. Thereafter, the strip 300 is advanced to a take-up reel 353 to be rolled thereabout. The above-mentioned coating means 340 includes a dippling tank 341 containing pressure-sensitive adhesive agent, a supply roll 342 and an spreading roll 343.

Figure 28:
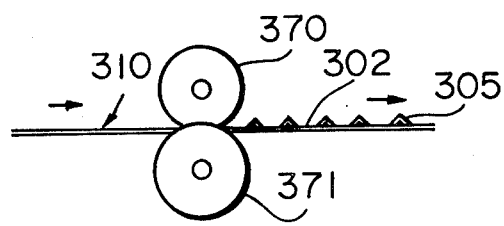
FIG. 28 is a side elevational view on an enlarged scale of the forming roll unit employed in the apparatus useful in both the apparatus of FIGS. 26 and 27.
Figure 29:
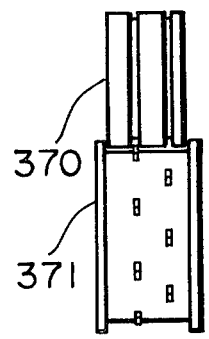
FIG. 29 is a front elevational view on an enlarged scale of said forming roll unit of FIG. 28.
Figure 31:
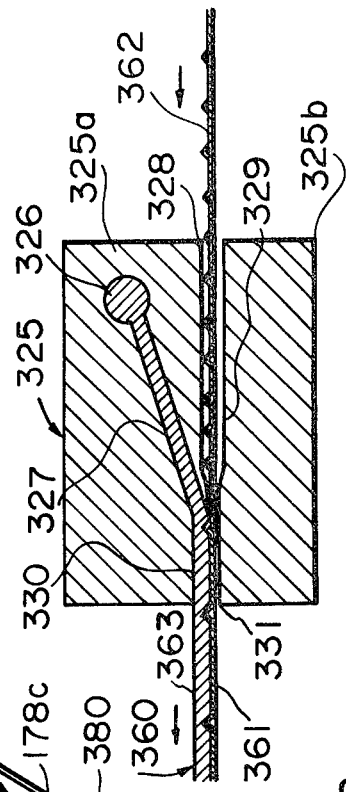
FIG. 31 is a longitudinally sectional view on an enlarged scale of the metal mold useful in the apparatus as shown in FIGS. 28 and 29.
Figure 30:
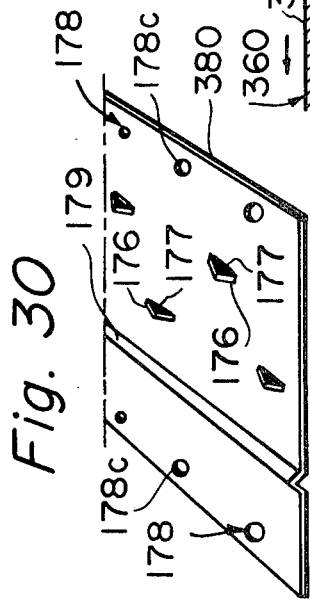
FIG. 30 is a perspective view of a strip material after the material has been shaped by the forming roll unit as shown in FIGS. 28 and 29.

FIGS. 26 through 31 show a modified process and apparatus for continuously extruding a laminated flexible non-skid strip 360 according to the present invention. First of all, a continuous length of web-sheet 362 formed of aluminum, copper, steel or stainless steel and constituting the lower layer of the laminated flexible non-skid strip is continuously payed out of a supply roll 310 of feed means in increment and passed to and through forming means where the sheet is passed between upper and lower forming rolls 370 and 371 which form angular projections 305 on the upper surface of the sheet in two rows extending in the longitudinal direction. If a web sheet 380 as shown in FIG. 28 is desired, forming rolls useful for the purpose may be selected as desired.

The formed sheet 362 is then passed over heating means 311 and further advanced to and through the inlet 328 of a split die 325 supported on a crosshead 324 of an extruder 320. The extruder 320 is charged through a hopper 321 with a granular non-rigid vinyl chloride having plasticizer, stabilizer, lubricant and filler blended therewith. The non-rigid vinyl chloride is advanced from the hopper 321 into a heating cylinder 322. As the vinyl chloride is advanced through the cylinder 322 by a screw 323 positioned within the cylinder, the vinyl chloride is fused and the ingredients of the material are kneaded together. The fused vinyl chloride is passed to and through a manifold 326 formed in the upper mould 325a of the die 325 under pressure.

The fused material is then passed through a passage 327 extending from the manifold 326 and terminating at the inner end of a sheet passage 329 having the inlet 328 into an upper layer application passage 330 which has the outlet 331 and is in communication with the inner ends of the passages 327 and 329. In the application passage 330, the fused vinyl chloride is applied onto the moving sheet 362 from the passage under pressure to thereby form the flexible non-skid upper layer 363 on the sheet 362 to produce the strip 360. After having issued from the outlet 331, the hot laminated strip 360 is passed through a cooling tank 332 to be cooled thereby and then passed to and between haul-off rolls 333 and 334 to be advanced to tape supply means to be continuously supplied with a pressure sensitive adhesive-backed tape 306 having a release paper adhered thereto. Thereafter, the laminated strip is advanced to tape application means where the strip passes in contact with press rollers 35 which press the tape 306 against the strip 360. Finally, the strip 360 is continuously taken up by a take-up reel 353 to be wound thereabout. The pressure and rotational speed of the haul-off rolls 333 and 334 of the above-mentioned pulling means can be adjusted in accordance with the pressure at the outlet 331. When the upper layer 363 of the flexible non-skid strip 360 comprises two laminas of different meterials, two extruders are employed with each extruder extruding one type of material and the two different materials are extruded onto the sheet 326 into two laminas.

Figure 32:
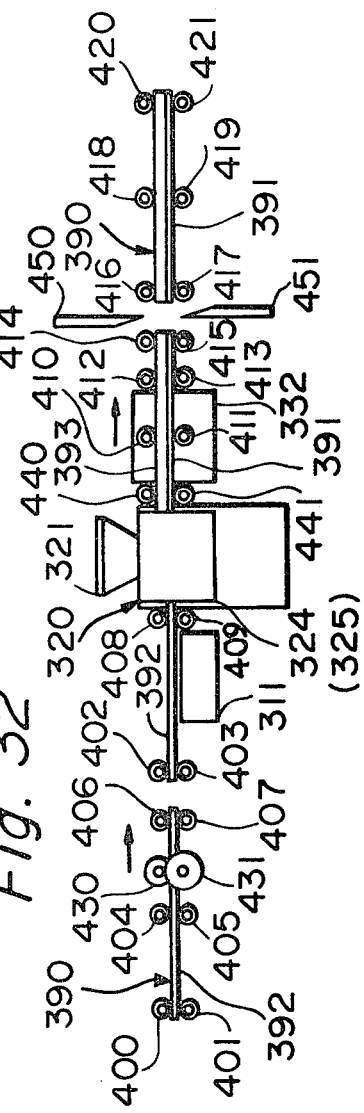
FIG. 32 is a schemative view in side elevation of further modified embodiment of apparatus for continuously producing flexible non-skid strips according to the present invention.

FIG. 32 shows a further modified process and an apparatus for continuously and intermittently producing a length of flexible non-skid strip 390. An extruder 320 is positioned in a substantially center point of the passage of each strip 390 and pairs of upper and lower feed and guide rolls 400-401, 402-403, 404-405, 406-407, 408-409, 410-411, 412-413, 414-415, 416-417, 418-419, 420-421 are positioned along the passage of the strip on the up stream of the extruder 320 and a pair of haul-off rolls 440 and 441 are disposed along the strip passage on the downstream of the extruder. These rolls are continuously driven at a constant speed to advance the sheet 392 in increment. The feed rolls 400 and 401 feed successive sheets at a spaced relationship to the rolls 404 and 405 which in turn feed the sheet to and through the nip between the forming rolls 430 and 431. After having passed through the forming rolls 430 and 431, each sheet is passed through the pairs of rolls 400-407 and 402-403 in the order to heating means 311. From the heating means 311, the sheet is passed to and through an extruder 320 where the sheet 392 is applied thereon fused synthetic resin to form the upper non-skid layer 393 on the sheet to thereby form a laminated flexible non-skid strip 390. The hot strip 390 is passed through haul-off rolls 440-441 and guide rolls 410-411 in succession to a cooling tank 332. From the cooling tank 332, the strip 390 is passed to and through shearing means where actuated cutters 450 and 451 shear a section of a predetermined length from the remaining laminated strip material to obtain a desired flexible non-skid strip 390.

While various embodiments of the invention have been shown and described in detail, it will be understood that these are for the purpose of illustration purpose only and is not to be taken as a definition of the scope of the invention, reference being had for this purpose to the appended claims.

What is claimed is:

1. An apparatus for continuously producing a flexible non-skid strip having a lower layer and an upper non-skid layer, said apparatus consisting essentially of
    feed means for continuously feeding a continuous length of sheet material which forms said lower layer from a supply roll, said sheet material being of a material selected from the group consisting of aluminum, copper, steel and stainless steel;
    forming means for receiving said sheet material from said feed means comprising upper and lower forming rolls having a peripheral surface shape for continuously making a plurality of spaced holes in the sheet material in the longitudinal direction thereof with arcuate projections on the upper surface of said sheet material bridging each of the holes;
    heating means for receiving said sheet material from said forming means and heating said sheet material;
    an extruding die including
        a straight application passage having an inlet for receiving said sheet material containing the spaced holes and arcuate projections thereupon at one end and an outlet at the other end, wherein a fused plastic material is integrally extruded onto the upper surface of said sheet material moving into said application passage as the sheet material passes through the application passage and wherein said fused plastic material is simultaneously permitted to flow into said holes of the sheet material moving into said application passage and to become integrally embedded in said arcuate projections on said sheet material;
        a straight sheet passage communicating with the inlet of said application passage extending in the longitudinal direction of said application passage, and guiding said sheet material from said heating means to said inlet of the application passage,
        a downwardly inclined passage therein communicating with said application passage whereby a fused plastic material may pass therethrough onto the upper surface of said sheet material as it passes through said application passage, and
        a manifold located above said sheet passage and therein communicating with said inclined passage;
    an extruder connected to said manifold for feeding said fused plastic material through said manifold and said inclined passage into said application passage for integrally forming the upper layer under pressure onto the perforated sheet material moving into said application passage so as to form an extruded product on the lower and upper layers; and
    cooling means for receiving the thus-formed product and continuously cooling said extruded product.

2. An apparatus according to claim 1, further including:
    hauling-off means for continuously hauling said cooled laminated product out of said extruding die and said cooling means; and
    taking-up means for continuously taking-up the laminated product from the hauling-off means and rolling it into a roll.

3. An apparatus according to claim 2, further comprising, between said hauling-off and taking-up means:
    coating means for applying pressure sensitive adhesive on the underside of said laminated product;
    release paper supply means for continuously supplying a release paper onto the adhesive coated surface; and
    pressing means for pressing said release paper against said laminated product.

* * * * *